United States Patent
Suzuki et al.

(10) Patent No.: US 11,029,770 B2
(45) Date of Patent: Jun. 8, 2021

(54) IMAGE DISPLAY APPARATUS AND METHOD, IMAGE DISPLAY SYSTEM, AND PROGRAM

(71) Applicant: Sony Corporation, Tokyo (JP)

(72) Inventors: Takaharu Suzuki, Tokyo (JP); Kazuyuki Yamamoto, Kanagawa (JP); Hidetoshi Kabasawa, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/719,645

(22) Filed: Dec. 18, 2019

(65) Prior Publication Data
US 2020/0125183 A1 Apr. 23, 2020

Related U.S. Application Data

(63) Continuation of application No. 15/883,178, filed on Jan. 30, 2018, now Pat. No. 10,540,025, which is a
(Continued)

(30) Foreign Application Priority Data

Apr. 6, 2009 (JP) ................................. 2009-091681

(51) Int. Cl.
*G06F 3/038* (2013.01)
*H04L 12/18* (2006.01)
(Continued)

(52) U.S. Cl.
CPC ............ *G06F 3/038* (2013.01); *G06F 3/0346* (2013.01); *G06F 3/1454* (2013.01); *H04L 12/1827* (2013.01); *H04N 7/147* (2013.01);

*H04N 7/15* (2013.01); *G06F 2203/0382* (2013.01); *G06F 2203/0384* (2013.01)

(58) Field of Classification Search
CPC .......... H04N 7/15; H04N 7/147; G06F 3/038; G06F 3/1454; G06F 2203/0382; G06F 2203/0384; G06F 3/0346; H04L 12/1827
See application file for complete search history.

(56) References Cited

U.S. PATENT DOCUMENTS

| 6,727,886 | B1 | 4/2004 | Mielekamp et al. |
| 8,242,972 | B2 | 8/2012 | Garibaldi et al. |
| (Continued) | | | |

FOREIGN PATENT DOCUMENTS

JP 2008-033389 2/2008

OTHER PUBLICATIONS

U.S. Appl. No. 12/750,073, filed Mar. 30, 2010, Suzuki et al.
(Continued)

*Primary Examiner* — Charles V Hicks
(74) *Attorney, Agent, or Firm* — Wolf, Greenfield & Sacks, P.C.

(57) ABSTRACT

According to some aspect, an image display apparatus may include a communication section receiving a plurality of remote operation signals corresponding to remote operations of a plurality of input apparatuses, and a combination section combining a first image based on the plurality of individual remote operation signals received by the communication section and a second image supplied from other apparatus into a third image, and outputting the third image.

11 Claims, 13 Drawing Sheets

Related U.S. Application Data continuation of application No. 15/061,438, filed on Mar. 4, 2016, now Pat. No. 9,910,517, which is a continuation of application No. 14/788,293, filed on Jun. 30, 2015, now Pat. No. 9,733,736, which is a continuation of application No. 12/750,073, filed on Mar. 30, 2010, now Pat. No. 9,110,521.

(51) Int. Cl.
  *H04N 7/14* (2006.01)
  *H04N 7/15* (2006.01)
  *G06F 3/0346* (2013.01)
  *G06F 3/14* (2006.01)

(56) References Cited

U.S. PATENT DOCUMENTS

| | | | |
|---|---|---|---|
| 9,110,521 B2 | 8/2015 | Suzuki et al. | |
| 9,733,736 B2 | 8/2017 | Suzuki et al. | |
| 9,910,517 B2 | 3/2018 | Suzuki et al. | |
| 2005/0117121 A1 | 6/2005 | Meerleer | |
| 2006/0077120 A1* | 4/2006 | Domi | G06F 3/0488 |
| | | | 345/2.3 |
| 2006/0092133 A1 | 5/2006 | Touma et al. | |
| 2007/0094618 A1 | 4/2007 | Yoshida | |
| 2007/0195008 A1 | 8/2007 | Ueno et al. | |
| 2007/0236409 A1 | 10/2007 | Piccionelli | |
| 2008/0318625 A1 | 12/2008 | Rofougaran | |
| 2010/0253621 A1 | 10/2010 | Suzuki et al. | |
| 2015/0301625 A1 | 10/2015 | Suzuki et al. | |
| 2016/0188001 A1 | 6/2016 | Suzuki et al. | |
| 2018/0157340 A1 | 6/2018 | Suzuki et al. | |

OTHER PUBLICATIONS

U.S. Appl. No. 14/788,293, filed Jun. 30, 2015, Suzuki et al.
U.S. Appl. No. 15/061,438, filed Mar. 4, 2016, Suzuki et al.
U.S. Appl. No. 15/883,178, filed Jan. 30, 2018, Suzuki et al.

* cited by examiner

IMAGE DISPLAY APPARATUS AND METHOD, IMAGE DISPLAY SYSTEM, AND PROGRAM

CROSS REFERENCES TO RELATED APPLICATIONS

This application is a continuation of and claims the benefit under 35 U.S.C. § 120 of U.S. patent application Ser. No. 15/883,178, titled "IMAGE DISPLAY APPARATUS AND METHOD, IMAGE DISPLAY SYSTEM, AND PROGRAM," filed on Jan. 30, 2018, now U.S. Pat. No. 10,540,025, which is a continuation of and claims the benefit under 35 U.S.C. § 120 of U.S. patent application Ser. No. 15/061,438, now U.S. Pat. No. 9,910,517, titled "IMAGE DISPLAY APPARATUS AND METHOD, IMAGE DISPLAY SYSTEM, AND PROGRAM," filed on Mar. 4, 2016, which is a continuation of and claims the benefit under 35 U.S.C. § 120 of U.S. patent application Ser. No. 14/788,293, now U.S. Pat. No. 9,733,736, titled "IMAGE DISPLAY APPARATUS AND METHOD, IMAGE DISPLAY SYSTEM, AND PROGRAM," filed on Jun. 30, 2015, which is a continuation of and claims the benefit under 35 U.S.C. § 120 of U.S. patent application Ser. No. 12/750,073, now U.S. Pat. No. 9,110,521, titled "IMAGE DISPLAY APPARATUS AND METHOD, IMAGE DISPLAY SYSTEM, AND PROGRAM," filed on Mar. 30, 2010, which claims priority under 35 U.S.C. § 119(a) to Japanese Patent Application JP 2009-091681, filed on Apr. 6, 2009. The entire content of each of these applications is hereby incorporated by reference.

BACKGROUND OF THE INVENTION

1. Field of the Invention

The present invention relates to an image display apparatus and method, image display system, and program. More particularly, the present invention relates to an image display apparatus and method, image display system, and program which allows sharing images.

2. Description of the Related Art

FIG. 1 is a diagram illustrating a configuration of a related-art conference system. This conference system 1 includes a personal computer 11, and a mouse 12 remotely operating the personal computer 11. The personal computer 11 supplies an image signal of an image displayed on a display 11A of the personal computer 11 to a projector 13. The projector 13 projects the image onto a screen 14. A plurality of participants who are attending a conference simultaneously view the image displayed on the screen 14.

When a presenter operates the mouse 12, a corresponding pointer 15 is displayed on the display of the personal computer 11. As a result, the pointer 15 is also displayed on the screen 14. The presenter is allowed to operate the mouse 12 to specify a predetermined icon, a position, etc., by the pointer 15.

However, in such a conference system, only a presenter is allowed to use the pointer 15, and a plurality of participants are not allowed to specify a predetermined icon, a position, etc., on the screen 14.

On the other hand, Japanese Unexamined Patent Application Publication No. 2008-33389 has proposed a method of using a laser pointer in place of a mouse, and specifying a predetermined position on the screen by the laser pointer. It becomes possible for a plurality of participants to specify a predetermined icon and a position on a screen 14 using a plurality of laser pointers.

SUMMARY OF THE INVENTION

However, in a conference system in Japanese Unexamined Patent Application Publication No. 2008-33389, a screen on which a position, etc., is pointed by a laser pointer of each participant is captured by a camera. And the captured image is analyzed so that the position pointed by the laser pointer is detected.

Accordingly, in the conference system of Japanese Unexamined Patent Application Publication No. 2008-33389, it becomes difficult to display the same image as an image projected on a screen including a point pointed by a laser pointer onto a plurality of display apparatuses, and to allow users of individual display apparatuses to share the image.

The present invention has been made in view of these circumstances. It is desirable to allow participants of a conference to share images.

According to an embodiment of the present invention, there is provided an image display apparatus including: a communication section receiving a plurality of remote operation signals corresponding to remote operations of a plurality of input apparatuses; and a combination section combining a first image based on the plurality of individual remote operation signals received by the communication section and a second image supplied from other apparatus into a third image, and outputting the third image.

In the above-described embodiment, the combination section may store the first image into a first layer, may store the second image into a second layer, and may combine the first image in the first layer and the second image in the second layer.

In the above-described embodiment, the second image may be an image operated by the remote operation signal of the input apparatus having an access right among the plurality of input apparatuses.

In the above-described embodiment, the communication section may transmit the remote operation signal of the input apparatus having the access right among the plurality of input apparatuses.

In the above-described embodiment, the second image may be an image operated by the remote operation signal directly received by the other apparatus from the input apparatus having the access right.

In the above-described embodiment, the second image output by the other apparatus may be a presentation image presented by a presenter holding the access right to a plurality of participants, and the third image output by the combination section may be an image produced by combining an image of a pointer of the input apparatus operated by the presenter and an image of a pointer of the input apparatus operated by the participants.

In the above-described embodiment, the communication section may receive the wireless remote operation signal from the input apparatus operated in a three-dimensional free space.

In the above-described embodiment, the input apparatus may be an input apparatus attached to the image display apparatus.

In the above-described embodiment, the input apparatus may be an input apparatus held by a user who operates the input apparatus.

According to another embodiment of the present invention, there is provided a method for displaying an image of an image display apparatus including a communication section and a combination section, the method including the steps of: the communication section receiving and identifying a plurality of remote operation signals corresponding to remote operations of a plurality of input apparatuses; and the combination section combining a first image based on the plurality of individual remote operation signals received and identified by the communication section and a second image supplied from other apparatus into a third image, and outputting the third image.

According to another embodiment of the present invention, there is provided an image display system including: an image display apparatus receiving a first image supplied from an image-signal out apparatus; and a plurality of input apparatuses attached to the image display apparatus and outputting a remote control signal to be transmitted to the image display apparatus on the basis of a user's operation, wherein the image display apparatus includes a communication section receiving and identifying the plurality of remote operation signals corresponding to remote operations of the plurality of input apparatuses, and a combination section combining a second image based on the plurality of individual remote operation signals received and identified by the communication section and the first image supplied from the image-signal out apparatus into a third image, and outputting the third image.

According to another embodiment of the present invention, there is provided a method for displaying an image of an image display system including an image display apparatus receiving a first image supplied from an image-signal output apparatus, and a plurality of input apparatuses attached to the image display apparatus and outputting a remote control signal to be transmitted to the image display apparatus on the basis of a user's operation, the image display apparatus including a communication section and a combination section, the method including the steps of: the communication section receiving and identifying the plurality of remote operation signals corresponding to remote operations of the plurality of input apparatuses; and the combination section combining a second image based on the plurality of individual remote operation signals received and identified by the communication section and the first image supplied from the image-signal out apparatus into a third image, and outputting the third image.

According to another embodiment of the present invention, there is provided an image display system including: a first image display apparatus displaying a first image; a second image display apparatus connected to the first image display apparatus and displaying a second image; a first input apparatus wirelessly transmitting a first remote control signal to the first image display apparatus; a second input apparatus wirelessly transmitting a second remote control signal to the second image display apparatus; and an image output apparatus connected to the first image display apparatus and outputting a third image to the first image display apparatus, wherein the first image display apparatus receives the second remote control signal from the second image display apparatus, the second image display apparatus receives the first remote control signal from the first image display apparatus, the first image display apparatus combines a fourth image based on the first remote control signal and the second remote control signal, stored in a first working layer, and the third image stored in a first image layer and supplied from the image output apparatus into the first image, and the second image display apparatus combines a fifth image based on the second remote control signal and the first remote control signal, stored in a second working layer, and the third image stored in a second image layer and supplied from the first image display apparatus into the second image.

In the above-described embodiment, the first image display apparatus, the first input apparatus, and the image output apparatus may be disposed in a first room, and the second image display apparatus and the second input apparatus may be disposed in a second room.

According to another embodiment of the present invention, there is provided a method for displaying an image of an image display system including a first image display apparatus displaying a first image, a second image display apparatus connected to the first image display apparatus and displaying a second image, a first input apparatus wirelessly transmitting a first remote control signal to the first image display apparatus, a second input apparatus wirelessly transmitting a second remote control signal to the second image display apparatus, and an image output apparatus connected to the first image display apparatus and outputting a third image to the first image display apparatus, the method including the steps of: the first image display apparatus receiving the second remote control signal from the second image display apparatus, the second image display apparatus receiving the first remote control signal from the first image display apparatus, the first image display apparatus combining a fourth image based on the first remote control signal and the second remote control signal, stored in a first working layer, and the third image stored in a first image layer and supplied from the image output apparatus into the first image, and the second image display apparatus combining a fifth image based on the second remote control signal and the first remote control signal, stored in a second working layer, and the third image stored in a second image layer and supplied from the first image display apparatus into the second image.

According to another embodiment of the present invention, there is provided an image display system including: a first image display apparatus displaying a first image; a first input apparatus wirelessly transmitting a first remote control signal to the first image display apparatus; a second image display apparatus displaying a second image; a second input apparatus wirelessly transmitting a second remote control signal to the second image display apparatus; and an image combination apparatus connected to the first image display apparatus and the second image display apparatus, wherein the image combination apparatus combines a third image based on the first remote control signal and the second remote control signal, stored in a first layer, and a fourth image output from the first image display apparatus and stored in the second layer into a combined image, and outputs the combined image to the first image display apparatus as the first image, and outputs the combined image to the second image display apparatus as the second image.

According to another embodiment of the present invention, there is provided a method for displaying an image of an image display system including a first image display apparatus displaying a first image; a first input apparatus wirelessly transmitting a first remote control signal to the first image display apparatus; a second image display apparatus displaying a second image; a second input apparatus wirelessly transmitting a second remote control signal to the second image display apparatus; and an image combination apparatus connected to the first image display apparatus and the second image display apparatus, the method including the step of the image combination apparatus combining a third image based on the first remote control signal, and the second remote control signal, stored in a first layer, and a fourth image output from the first image display apparatus and stored in the second layer into a combined image, and outputting the combined image to the first image display apparatus as the first image, and outputting the combined image to the second image display apparatus as the second image.

As described above, by an embodiment of the present invention, it becomes possible to share an image.

DESCRIPTION OF THE PREFERRED EMBODIMENTS

In the following, descriptions will be given of modes for carrying out the invention (in the following, referred to as embodiments). In this regard, the descriptions will be given in the following order.
1. First embodiment (configuration of image display system)
2. First embodiment (operation of image display system)
3. Second embodiment (operation of image display system)
4. Third embodiment (configuration of image display system)
5. Third embodiment (operation of image display system)
6. Fourth embodiment (operation of image display system)
7. Fifth embodiment (configuration of image display system)
8. Fifth embodiment (operation of image display system)
9. Sixth embodiment (configuration of image display system)
10. Sixth embodiment (operation of image display system)

1. First Embodiment

Configuration of Image Display System

Figure 1:
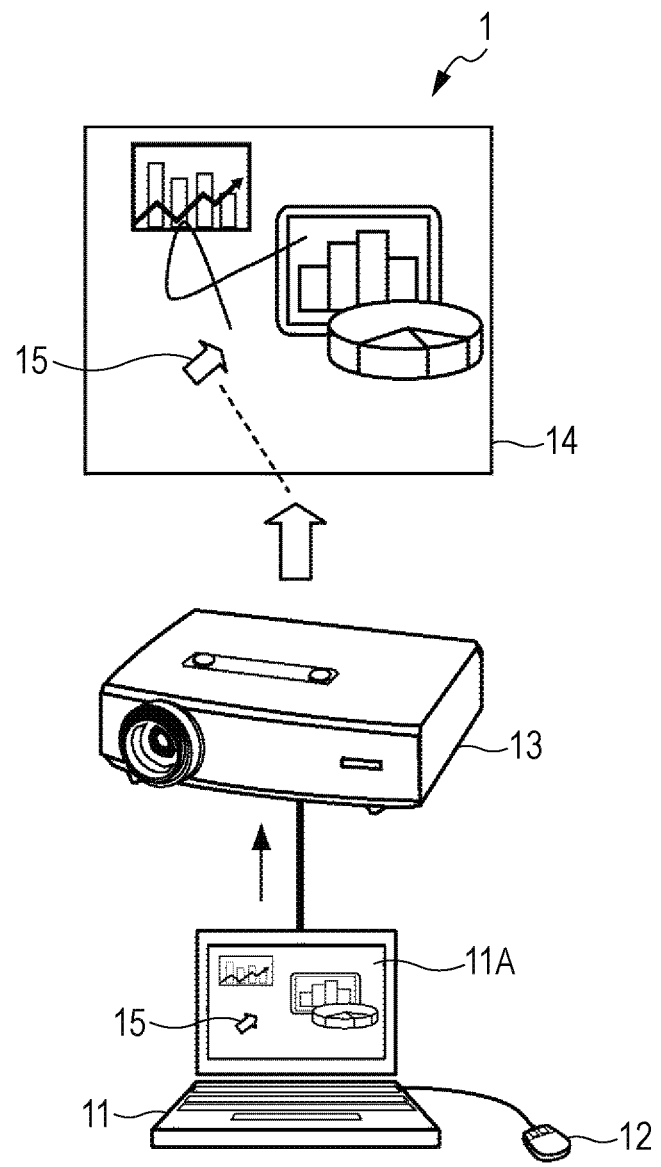
FIG. 1 is a diagram illustrating a configuration of a related-art conference system.
Figure 2:
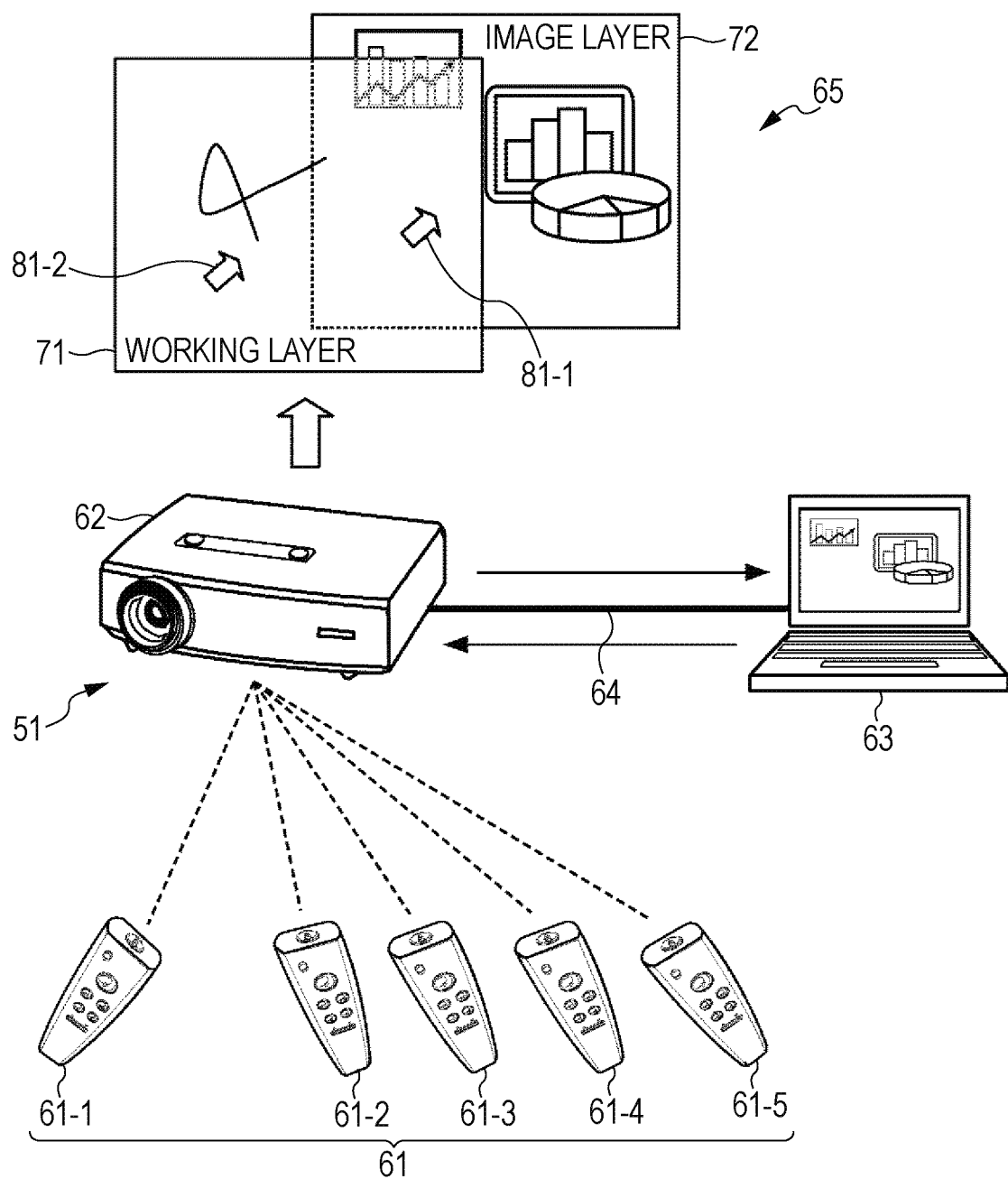
FIG. 2 is a diagram illustrating a configuration of an image display system according to an embodiment of the present invention.

FIG. 2 is a diagram illustrating a basic configuration of an image display system according to an embodiment of the present invention. In this embodiment, an image display system 51, as a conference system, includes an image display apparatus 62 and an image-signal output apparatus 63 disposed in a conference room. The image display apparatus 62 and the image-signal output apparatus 63 are connected through a cable 64, such as an HDMI (High-Definition Multimedia Interface), etc., and can exchange information with each other.

Pointing devices 61, as input apparatuses attached to the image display apparatus 62, are operated by participants (users) of a conference in any direction in a three-dimensional free space. The pointing devices 61 output remote control signals based on operations wirelessly, such as by infrared light, etc., to the image display apparatus 62. In the case of this embodiment, as pointing devices 61, five pointing devices 61-1 to 61-5 are provided. Infrared light has directivity, and thus in the case where a plurality of image display apparatuses 62 are provided, it is effective for a user to selectively give a direction to one of the apparatuses, which the user intends to use.

A remote control signal of the pointing devices 61 (for example, a pointing device 61-1) of a presenter out of the five pointing devices 61 is output to the image display apparatus 62, and then is supplied to the image-signal output apparatus 63 through the cable 64. On the contrary, the image-signal output apparatus 63 including a personal computer, etc., supplies an image having been subjected to predetermined processing on the basis of the remote control signal supplied through the cable 64 to the image display apparatus 62 through the cable 64.

The image display apparatus 62 holds a working layer 71 and an image layer 72 in an internal memory. Images of the pointers of individual pointing devices 61-1 to 61-5 are stored in the working layer 71. In FIG. 2, only a pointer 81-1 and a pointer 81-2 of the pointing device 61-1 and the pointing device 61-2, respectively, are shown for the sake of simplicity. An image supplied from the image-signal output apparatus 63 through the cable 64 is stored in the image layer 72. The image display apparatus 62 combines the images stored in the working layer 71 and the image layer 72, and projects the combined image onto a display section 65.

If the display section 65 is a screen on which an image optically projected is displayed, the image display apparatus 62 includes a projector. If the display section 65 is an LCD (Liquid Crystal Display), a CRT (Cathode Ray Tube), a plasma display, etc., the image display apparatus 62 may include, for example, a personal computer. In this regard, the image display apparatus 62 may be integrated with the image-signal output apparatus 63.

Figure 3:
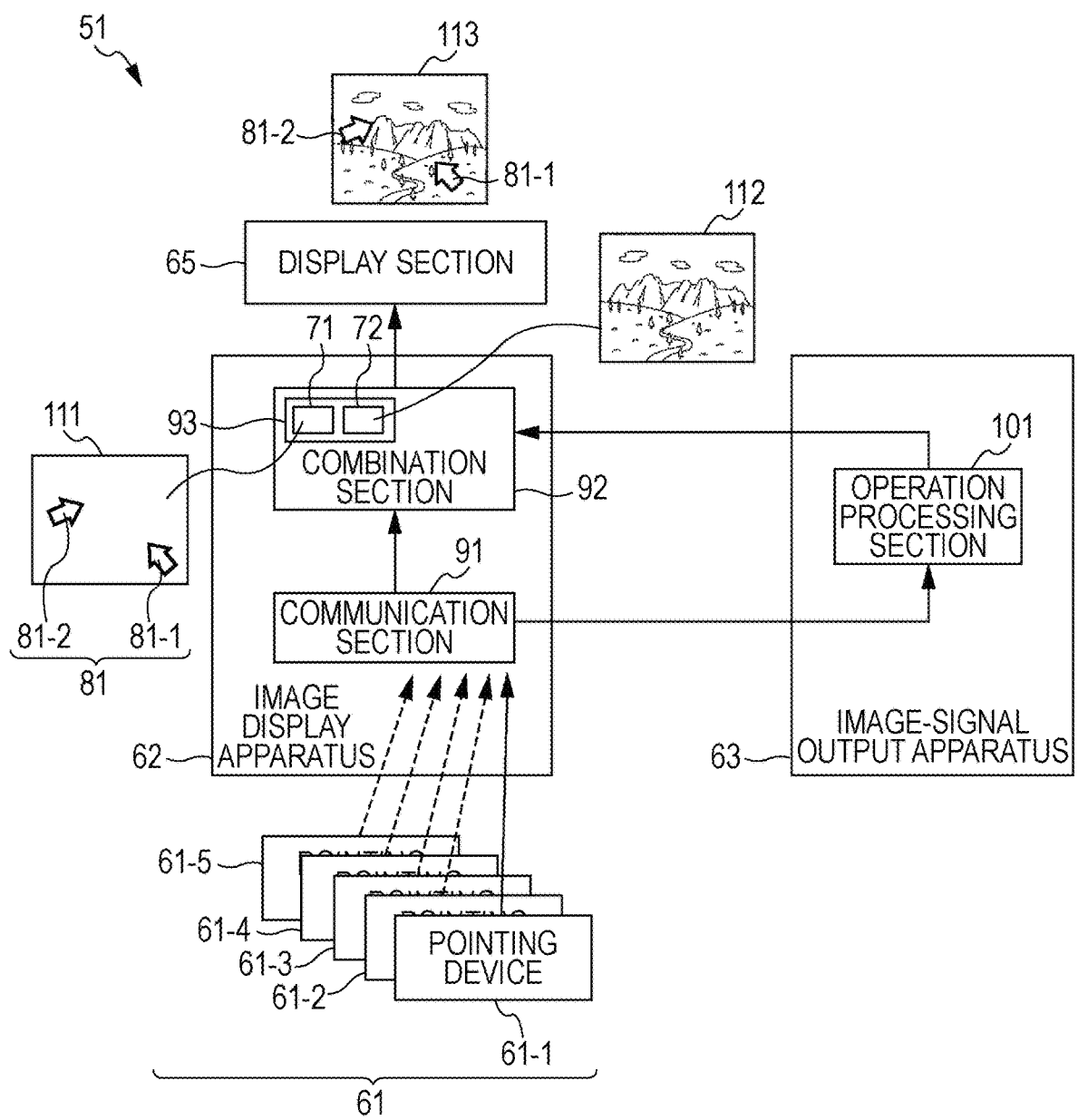
FIG. 3 is a diagram illustrating a configuration of an image display system according to an embodiment of the present invention.

FIG. 3 is a block diagram illustrating a more detailed configuration of the image display system 51. The image display apparatus 62 functionally has a communication section 91 and a combination section 92. The communication section 91 performs communication with the pointing devices 61. The communication section 91 supplies a remote control signal from one of the pointing devices (for example, the pointing device 61-1) having an access right among the pointing devices 61 to the image-signal output apparatus 63. Also, the communication section 91 supplies the remote control signals from all the pointing devices 61-1 to 61-5 to the combination section 92 regardless of having an access right or not.

The combination section 92 has the working layer 71 and the image layer 72 in an internal memory 93. An image 111 of the pointers 81-1 to 81-5 corresponding to the individual pointing devices 61-1 to 61-5 is stored in the working layer 71. FIG. 3 shows a state, in which only the pointers 81-1 and 81-2 corresponding to the pointing devices 61-1 and 61-2, respectively are stored, for the sake of convenience of explanation. An image 112 supplied from the image-signal output apparatus 63 is stored in the image layer 72. The combination section 92 combines the image 111 stored in the working layer 71 as a first image, and the image 112 stored in the image layer 72 as a second image into an image 113 as a third image, and outputs and displays the third image onto the display section 65.

The image-signal output apparatus 63 has an operation processing section 101. The operation processing section 101 obtains a remote control signal of the pointing device 61-1 having an access right from the communication section 91 of the image display apparatus 62. This remote control signal includes a signal corresponding to an operation, such as a decision key, a go-forward key, a return key, etc., for example. The operation processing section 101 performs processing corresponding to the obtained remote control signal, and outputs an image based on the processing result to the combination section 92 of the image display apparatus 62 as the image 112.

Operation of Image Display System

Figure 4:
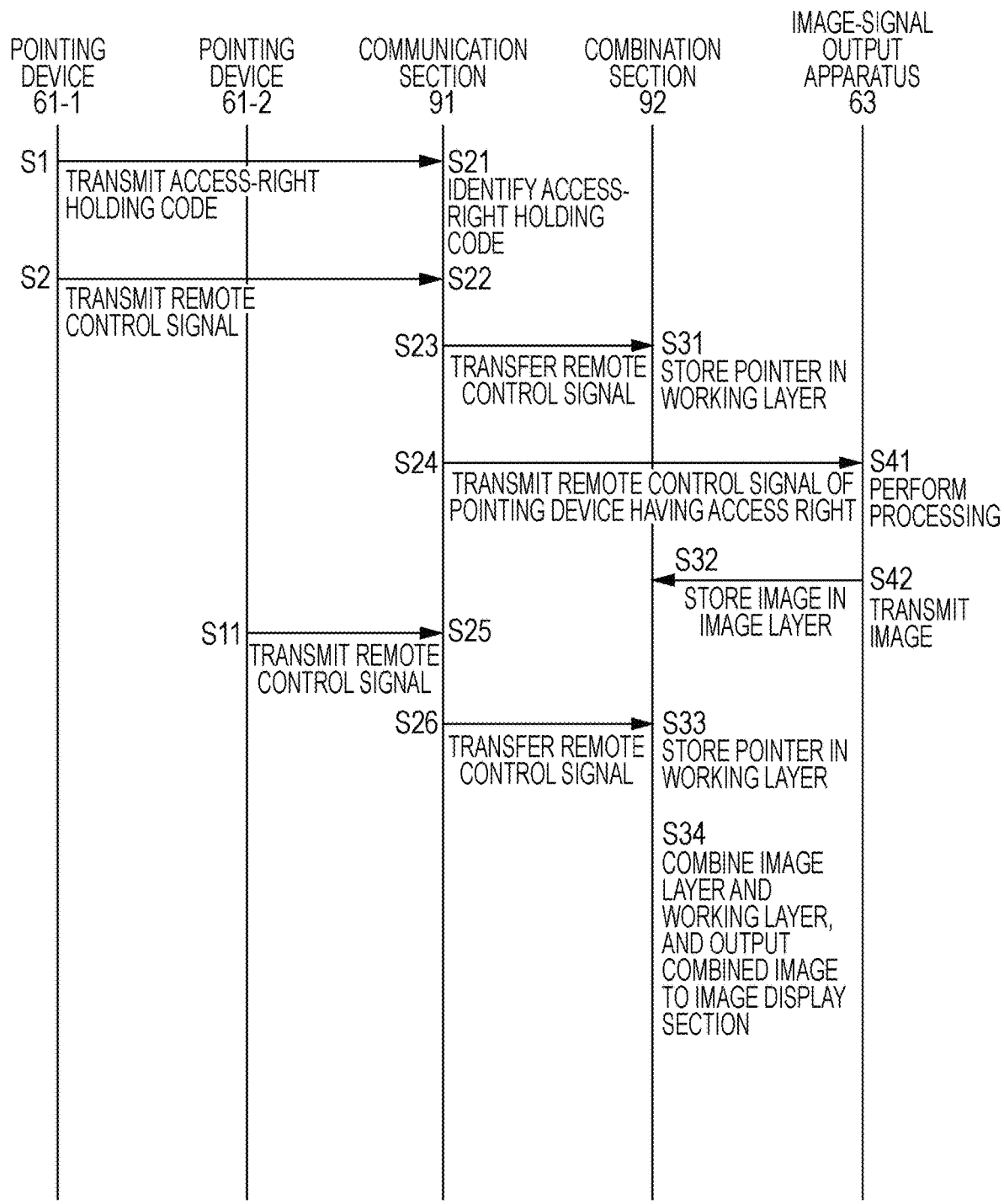
FIG. 4 is a flowchart illustrating operation of an image display system.

FIG. 4 is a flowchart illustrating operation of an image display system. In the following, a description will be given of an operation of the image display system in FIG. 3 with reference to FIG. 4. In this regard, in the following description, it is assumed that there are two pointing devices 61, that is to say, the pointing device 61-1 has an access right, and the pointing device 61-2 does not have an access right among the two devices, for the sake of convenience of explanation.

In step S1, the pointing device 61-1 transmits an access-right holding code. The access right is a right to access an image output by the image-signal output apparatus 63. Only the user of the pointing device having this right can access an image output by the image-signal output apparatus 63, and, for example, can operate a predetermined icon, etc., so as to change the image to a predetermined image. That is to say, a right to permit access to an image stored in the image layer 72 is the access right.

The transmission processing of the access-right holding code is executed by a user operating a predetermined button on the pointing device 61-1, or by a user using a predetermined gesture. In this regard, the pointing device 61-2 and the pointing device 61-1 have the same configuration, and thus it is possible to transmit an access-right holding code and to hold the access right by performing the same operation. The latest access-right holding code is determined to be valid, and a position of the access-right holder up to that time is released. That is to say, a holder of any of the pointing devices 61 can be an access-right holder as necessary.

In step S21, when the communication section 91 of the image display apparatus 62 receives an access-right holding code from the pointing device 61-1, the communication section 91 identifies the access-right holding code. An identification number of each pointing device 61 is also attached to the access-right holding code. After that, the communication section 91 processes the remote control signal of the identification number attached to the access-right holding code as a signal from the pointing device 61 of the access right holder.

In step S2, the pointing device 61-1 transmits a remote control signal. The remote control signal includes various kinds of signals, such as a signal indicating a pointer position, a decision operation, etc. That is to say, if the user operates the pointing device 61-1 in any direction in a three-dimensional space, the remote control signal is transmitted in order to move and display the pointer to the position corresponding to the operation. Alternatively, if a predetermined decision operation is performed, for example, if a predetermined button of the pointing device 61-1 is pressed, etc., the remote control signal corresponding to that operation is transmitted. This is the same for the transmission step of the remote control signal described later.

In step S22, the communication section 91 receives the remote control signal. In step S23, the communication section 91 transfers the remote control signal to the combination section 92. The transfer may be performed by passing through the signal or by replacing the signal by another signal as long as internal information of the signal is transmitted.

In step S31, the combination section 92 stores a pointer in the working layer. Specifically, the combination section 92 changes the position of the pointer 81-1 corresponding to the pointing device 61-1 to a position based on the operation. In this regard, information input by handwriting, etc., is also stored in the working layer 71.

In step S24, the communication section 91 transmits the remote control signal of the pointing device having an access right to the image-signal output apparatus 63. In this case, the pointing device 61-1 has the access right, and thus the remote control signal of the pointing device 61-1 received in step S22 is transmitted to the image-signal output apparatus 63.

In step S41, the operation processing section 101 of the image-signal output apparatus 63 performs processing corresponding to the remote control signal received from the communication section 91, that is to say, received from the pointing device having the access right. For example, if one thumbnail image is selected from a plurality of thumbnail images, an image corresponding to the selected thumbnail image is reproduced. In step S42, the operation processing section 101 transmits the image. That is to say, the image corresponding to the selected thumbnail image is transmitted. In FIG. 3, the image 112 is shown as a presentation image presented by the user of the pointing device 61-1 having the access right to other users (participants of the conference). In this manner, the pointing device 61-1 having the access right can operate electronic information of the icon, etc.

In step S32, the combination section 92 of the image display apparatus 62 receives the image transmitted from the image-signal output apparatus 63, and stores the image into the image layer. Specifically, the received image 112 is stored in the image layer 72 of the memory 93.

In step S11, if a user of the pointing device 61-2 operates the pointing device 61-2, the pointing device 61-2 transmits the remote control signal corresponding to that operation.

In step S25, the communication section 91 of the image display apparatus 62 receives the remote control signal from the pointing device 61-2. In step S26, the communication section 91 transfers the received remote control signal. The destination of this transfer is not the image-signal output apparatus 63, but the combination section 92. The communication section 91 transfers only the remote control signal of the pointing device having the access right to the image-signal output apparatus 63. The remote control signal of the pointing device not having the access right is transferred to the combination section 92. Thereby, unnecessary operation hindrance by a user not having the access right is prevented.

In step S33, the combination section 92 stores the pointer into the working layer. Specifically, the combination section 92 changes the position of the pointer 81-2 corresponding to the pointing device 61-2 to the position based on the operation. Thereby, an image including the pointer 81-1 and the pointer 81-2, as shown as the image 111 in FIG. 3, is stored in the working layer 71. In this regard, the pointer of the pointing device not having the access right is deleted if the corresponding pointing device is not operated for a certain time period or more set in advance. However, the pointer of the pointing device having the access right is not deleted even if the corresponding pointing device is not operated for a certain time period or more set in advance. Thereby, the display of an unnecessary number of pointers or more is prevented, and thus the original image 112 is kept to be viewed easily.

In step S34, the combination section 92 combines the image layer and the working layer, and outputs the result to the display section 65. Thereby, the combined image of the image 112 and the image 111 is displayed on the display section 65 as shown in the image 113 in FIG. 3.

In this regard, the combination section 92 holds the working layer 71 and the image layer 72 in a one-to-one relationship. Accordingly, if the image layer 72 is changed to an image of a new page, the working layer 71 is also changed. Accordingly, hand-written information, etc., written in accordance with each page of the image is not deleted and held even if the page is changed. If the image of the page before the change is re-displayed, the information written in the working layer 71 correspondingly to that page is re-displayed. The information in the working layer 71 may be transferred to the image-signal output apparatus 63, and may be saved in a state of being combined with the original image 112.

In this manner, in this embodiment, images of the two layers are combined, and the combined image is output. Accordingly, it becomes possible to output and display the same combined image including the pointer onto a plurality of display apparatuses, allowing the users to share the same image.

Also, in this embodiment, the pointing device 61 is not directed to a screen, but is directed to the image display apparatus 62. The screen is disposed at a position near a wall, etc., which is far from the user. However, the image display apparatus 62 can be disposed at a nearer position to the user than the screen. Accordingly, even if the pointing device 61 is shaked because of a shake of a hand at the time of pointing operation, etc., it becomes possible to direct the pointing device to a predetermined position correctly and swiftly compared with directly directing toward the screen. That is to say, it is possible to correctly and swiftly point the pointing device at a predetermined position on the image that a plurality of users are viewing in common, thereby improving the operationality.

Also, by giving an access right to one of the pointing devices 61, it is possible for a presenter to reliably perform remote control on the presentation image without being hindered by the other participants of the conference. Further, the access right can be easily transferred only by operating a predetermined button, or with the use of a predetermined gesture. Accordingly, it becomes possible for each user to easily hold a position of a presenter without exchanging the pointing devices 61. As a result, it becomes possible to conduct an organized conference efficiently.

Second Embodiment

Operation of Image Display System

Next, a description is given of an embodiment of the case where individual users possess pointing devices 61 individually. The configuration is the same as that of the case shown in FIG. 3, and thus the illustration thereof is omitted. In the following, a description will be given of the operation of the image display system with reference to FIG. 5.

Figure 5:
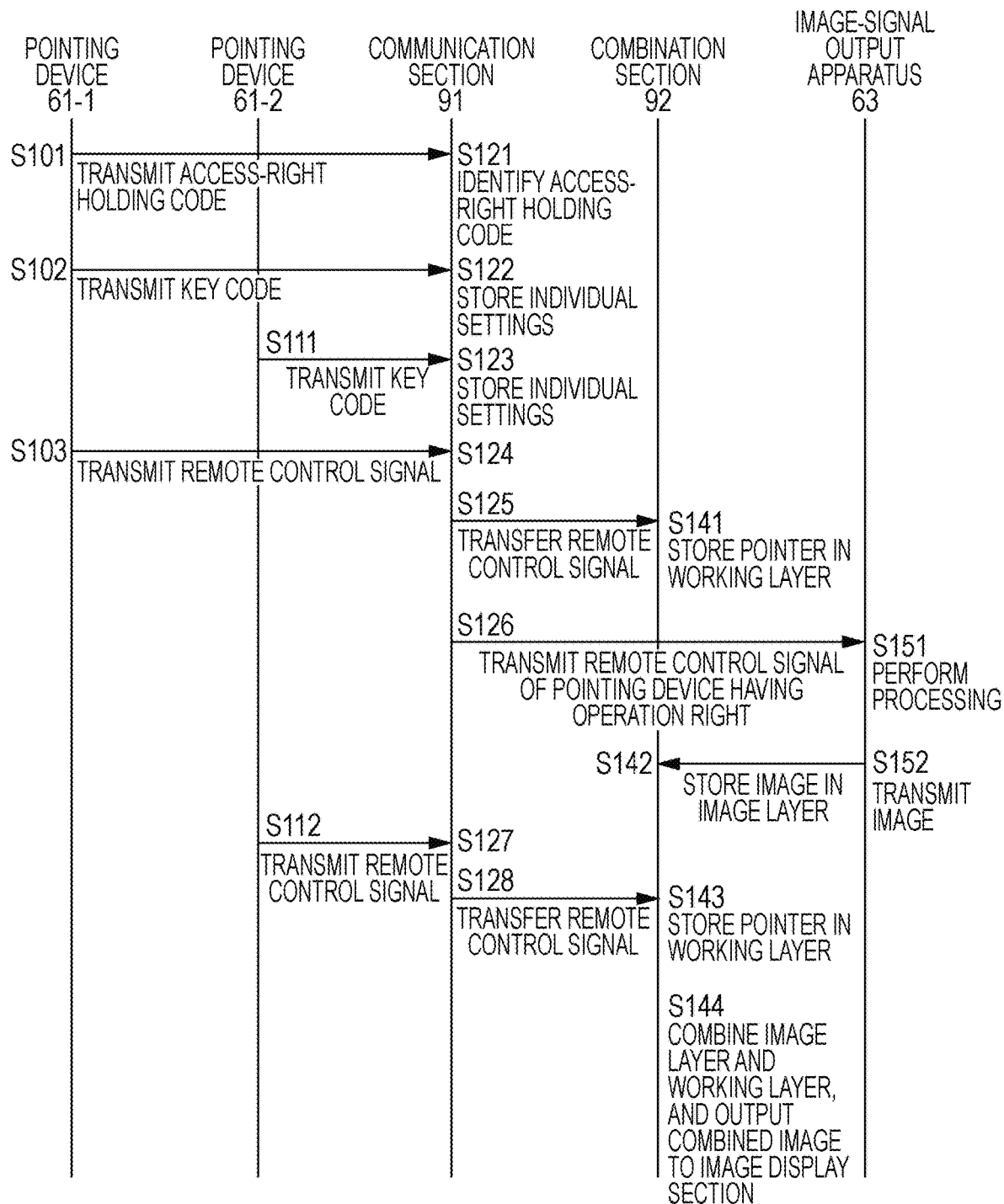
FIG. 5 is a flowchart illustrating operation of an image display system.

The processing from step S101 to step S152 in FIG. 5 is basically the same as the processing from step S1 to step S42 in FIG. 4. The different points are as follows. That is to say, the point that processing of step S102 is inserted between step S101 and step S103, which is corresponding to step S1 and step S2 in FIG. 4, and the point that step S111 is inserted before step S112, which is corresponding to step S11 in FIG. 4 are different. Also, the point that steps S122 and S123 are inserted between step S121 and step S124, which are corresponding to step S21 and step S22 in FIG. 4 is different.

In this embodiment, in step S101, the pointing device 61-1 transmits an access-right holding code. As described above, the transmission processing of the access-right holding code is executed by a user operating a predetermined button, determined in advance, on the pointing device 61, or by a user using a predetermined gesture.

In step S121, when the communication section 91 of the image display apparatus 62 receives the access-right holding code from the pointing device 61-1, the communication section 91 identifies the access right holding code.

In step S102, the pointing device 61-1 transmits a key code. The key code is information for customizing a color and shape of the pointer and information for carrying out user-specific individual settings, such as correction of a shake by hand, sensitivity, and so on. In this regard, in this embodiment, the key code is transmitted when a predetermined button on the pointing device 61 is operated, or a predetermined gesture is made. However, the key code may be included in the remote control signal that is output in response to an operation of the pointing device 61.

In step S122, the communication section 91 of the image display apparatus 62 receives the key code transmitted from the pointing device 61-1, and stores the individual settings corresponding to the key code into the internal memory.

In step S111, the pointing device 61-2 transmits the key code.

In step S123, the communication section 91 of the image display apparatus 62 receives the key code transmitted from the pointing device 61-2, and stores the individual settings corresponding to the key code into the internal memory.

In this manner, when the communication section 91 stores the individual settings, the communication section 91 applies the individual settings to the remote control signal from the pointing device 61 after that. As a result, a shake of hand is corrected on the basis of the sensitivity of each of the pointing devices 61. Also, the pointer is displayed with the color and shape corresponding to the pointing device 61.

Each processing of the subsequent steps S103, S112, S124 to S128, S141 to S144, S151, and S152 is the same as processing of steps step S2, S11, S22 to S26, S31 to S34, S41, and S42 in FIG. 4. Accordingly, the explanation thereof becomes repetitive, and thus is omitted.

In this manner, it becomes possible for each user to perform operations suitable for his/her pointing device 61 in this embodiment.

Third Embodiment

Configuration of Image Display System

Figure 6:
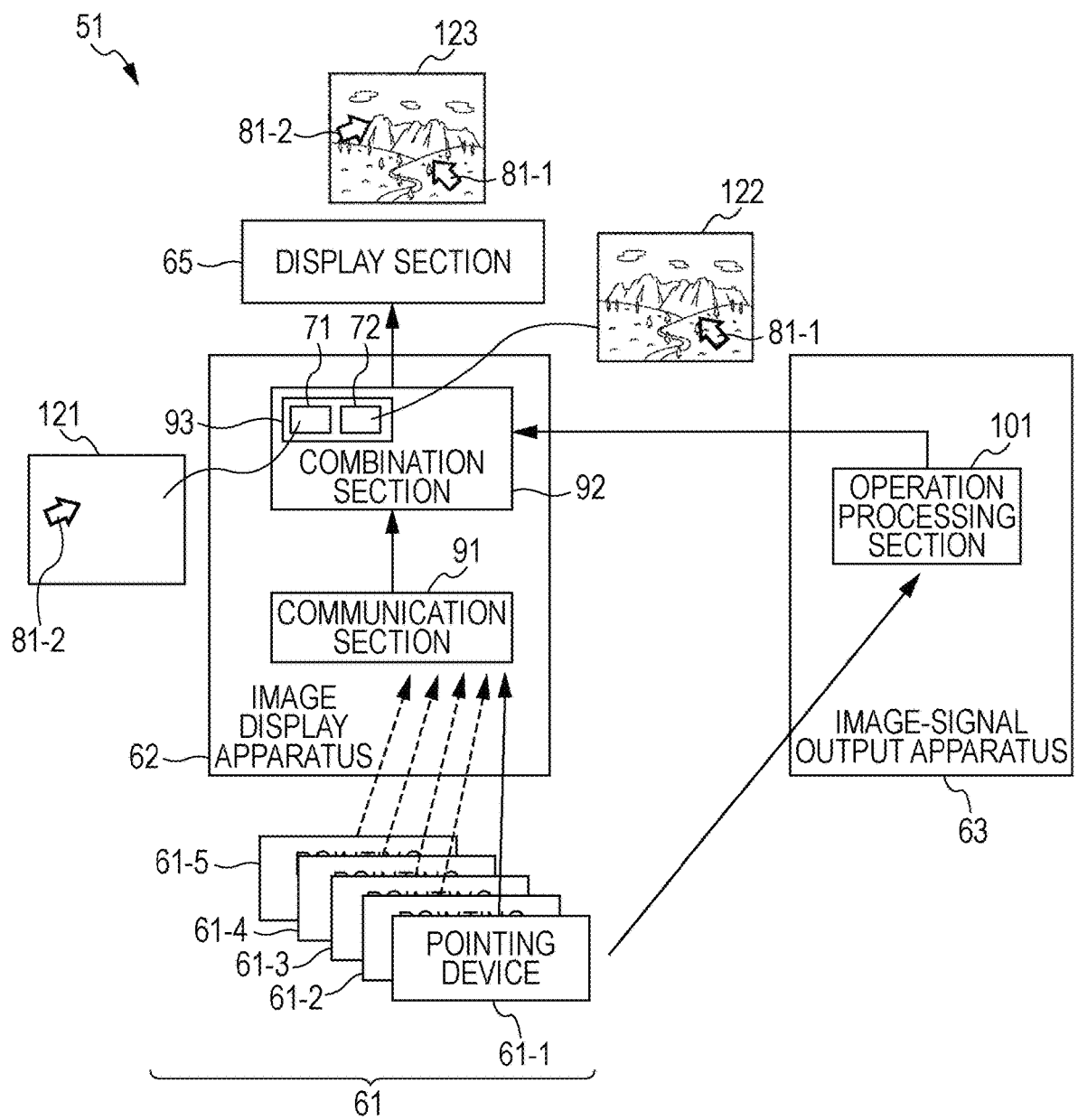
FIG. 6 is a diagram illustrating a configuration of an image display system according to an embodiment of the present invention.

FIG. 6 is a diagram illustrating a configuration of an image display system according to a third embodiment. The image display system 51 in FIG. 6 has basically the same configuration as that of the image display system in FIG. 3. However, one of the different points is that the remote control signal of the pointing device 61-1 having an access right is transmitted not only to the image display apparatus 62, but also to the image-signal output apparatus 63. Also, the communication section 91 does not transmit the remote control signal from the pointing device to the operation processing section 101.

Operation of Image Display System

Figure 7:
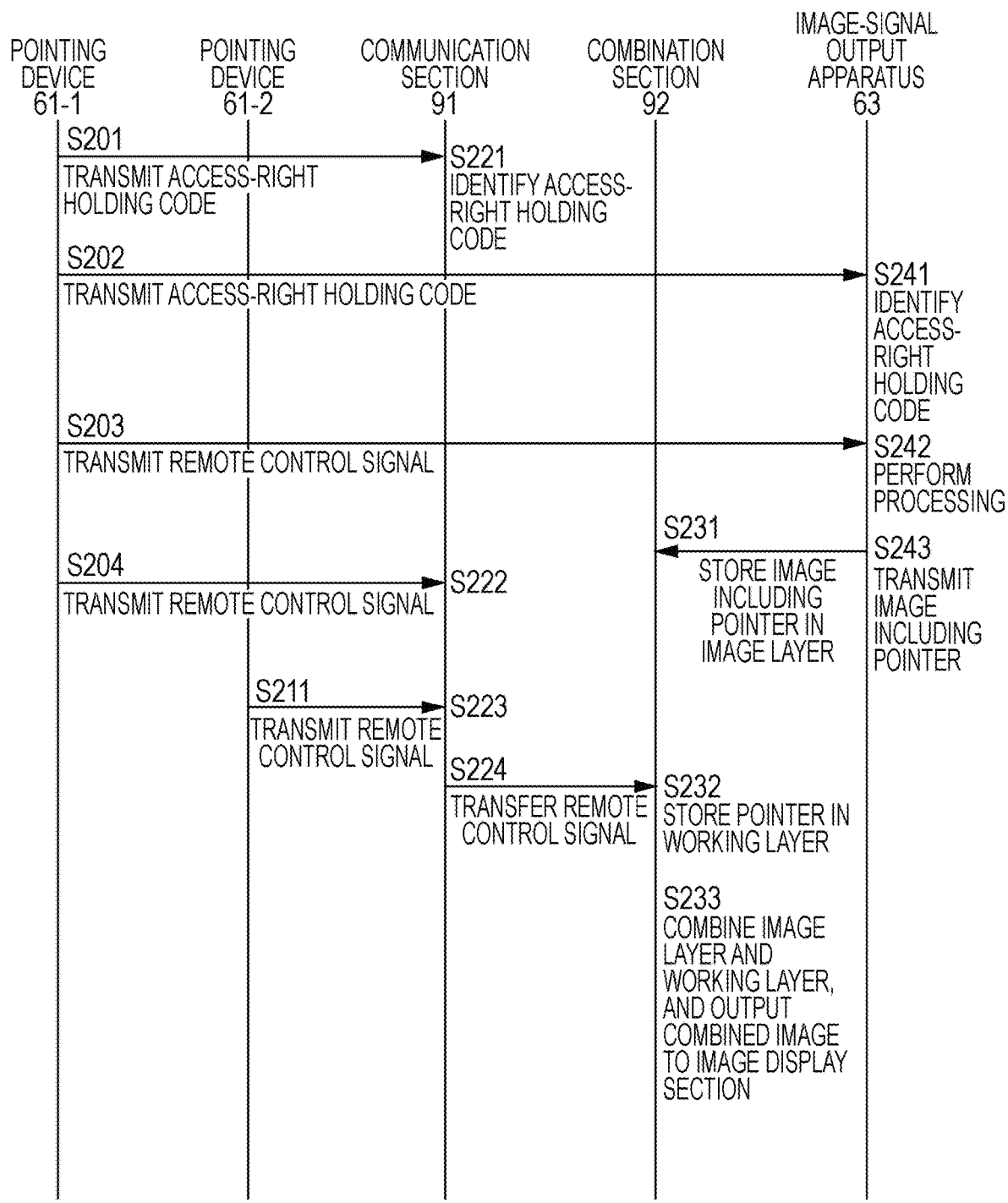
FIG. 7 is a flowchart illustrating operation of an image display system.

FIG. 7 is a flowchart illustrating an operation of the image display system. In the following, a description will be given of the operation of the image display system in FIG. 6 with reference to FIG. 7.

In step S201, the pointing device 61-1 transmits an access-right holding code.

In step S221, when the communication section 91 of the image display apparatus 62 receives the access-right holding code from the pointing device 61-1, the communication section 91 identifies the access-right holding code. Thereby, it becomes possible to identify the pointing device having the access right.

In step S202, the pointing device 61-1 transmits the access-right holding code to the image-signal output apparatus 63. This access-right holding code is the same code transmitted to the image display apparatus 62 in step S201.

In step S241, when the operation processing section 101 of the image-signal output apparatus 63 receives the access-right holding code from the pointing device 61-1, the operation processing section 101 identifies the access-right holding code. Thereby, it becomes possible to identify the pointing device having the access right.

In step S203, the pointing device 61-1 transmits the remote control signal.

In step S242, the operation processing section 101 of the image-signal output apparatus 63 performs processing corresponding to the remote control signal received from the pointing device 61-1 having the access right. Whether the access right is held or not is determined on the basis of the identification number corresponding to the access-right holding code identified in step S241. In step S243, the operation processing section 101 transmits an image including a pointer. For example, an image selected in step S242 is transmitted. In FIG. 6, the image is shown as the image 122. As shown in the figure, the image 122 includes a pointer 81-1 of the pointing device 61-1 having the access right.

In step S231, the combination section 92 of the image display apparatus 62 receives the image including the pointer, which has been transmitted from the image-signal output apparatus 63, and stores the image in the image layer. That is to say, the image 122 including the received pointer is stored in the image layer 72 in the memory 93.

In step S204, the pointing device 61-1 transmits the remote control signal based on the operation of the pointing device 61-1 to the image display apparatus 62.

In step S222, the communication section 91 of the image display apparatus 62 receives the remote control signal from the pointing device 61-1.

In this regard, although the illustration is omitted, the communication section 91 can transfer the remote control signal of the pointing device 61-1 having an access right to the combination section 92. At this time, the combination section 92 allows the pointing device 61-1 having the access right to access the working layer 71. As a result, the user of the pointing device 61-1 having the access right is allowed to perform an operation, such as deletion of an object drawn in the working layer 71 by the user of the pointing device 61-2 not having the access right, etc., for example.

In step S211, when the user of the pointing device 61-2 operates the pointing device 61-2, the pointing device 61-2 transmits the remote control signal corresponding to the operation.

In step S223, the communication section 91 of the image display apparatus 62 receives the remote control signal from the pointing device 61-2. In step S224, the communication section 91 transfers the received remote control signal to the combination section 92.

In step S232, the combination section 92 stores the pointer in the working layer. Specifically, a position of the pointer 81-2 corresponding to the pointing device 61-2 is changed to a position based on the operation. Thereby, an image including the pointer 81-2, as shown in the image 121 in FIG. 6, is stored in the working layer 71.

In step S233, the combination section 92 combines the image layer and the working layer, and outputs the result to the display section 65. Thereby, the image produced by combining the image 122 and the image 121 is displayed onto the display section 65 as shown by an image 123 in FIG. 6. As described above, the 122 is the image including the image to be processed and the pointer 81-1 of the pointing device 61-1 having the access right. Also, the image 121 is the image including the pointer 81-2 of the pointing device 61-2 not having the access right.

In this embodiment, it also becomes possible to achieve the same advantages as those of the embodiment in FIG. 3.

Fourth Embodiment

Operation of Image Display System

Next, a description will be given of an operation of an embodiment in the case where individual users have individual pointing devices 61 in the image display system 51 in FIG. 6 with reference to a flowchart in FIG. 8.

Figure 8:
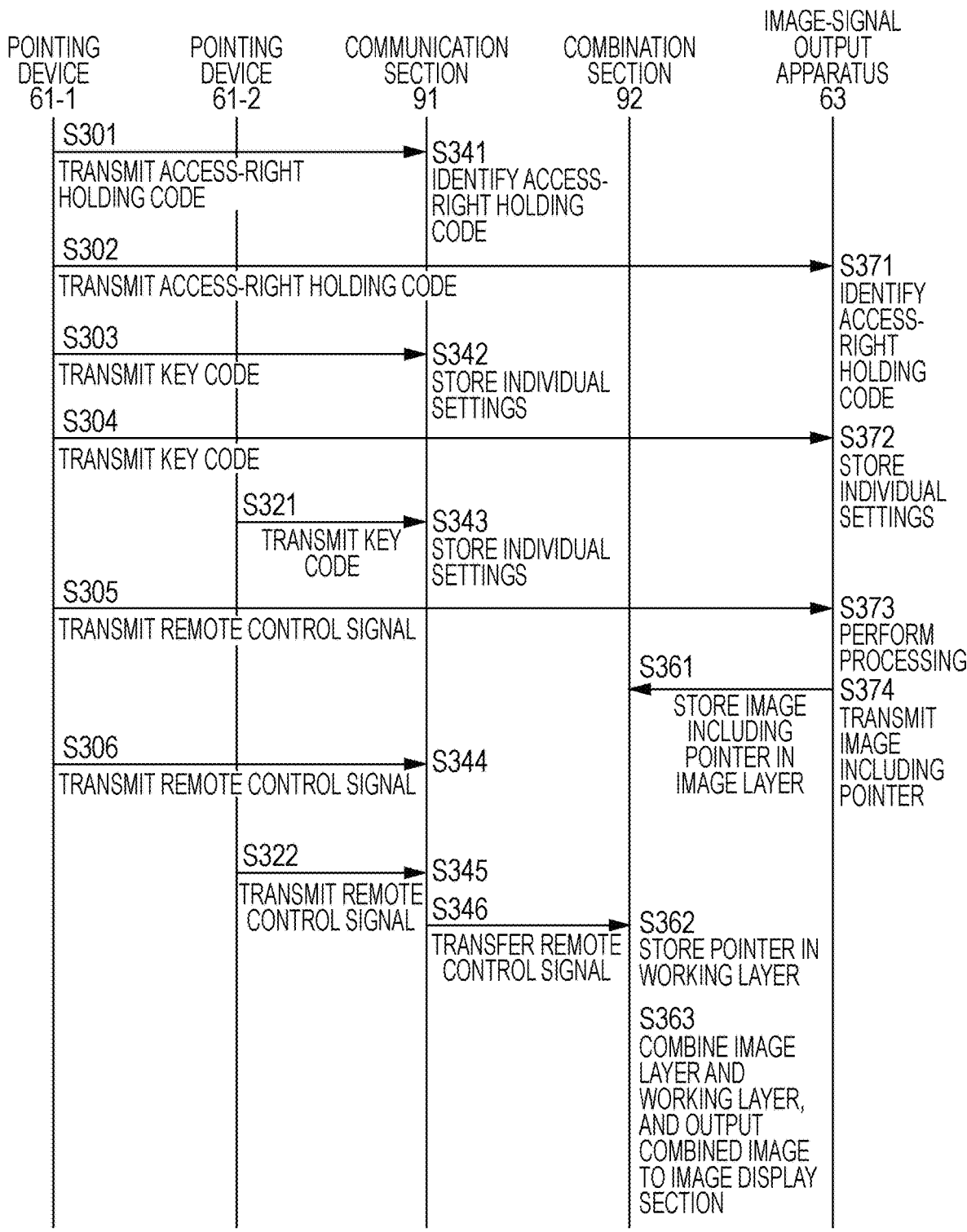
FIG. 8 is a flowchart illustrating operation of an image display system.

The processing from step S301 to step S374 in FIG. 8 is basically the same as the processing from step S201 to step S243 in FIG. 7. The different points are as follows. That is to say, the point that processing of steps S303 and S304 is inserted between step S302 and step S305, which is corresponding to step S202 and step S203 in FIG. 7, and the point that step S321 is inserted before step S322, which is corresponding to step S211 in FIG. 7 are different. Also, the point that steps S342 and S343 are inserted between step S221 and step S222, which are corresponding to step S221 and step S222 in FIG. 7 is different. Further, the point that step S372 is inserted between step S371 and step S373, which is corresponding to step S241 and step S242 in FIG. 7 is different.

In this embodiment, the pointing device 61-1 transmits the access-right holding code in step S301.

In step S341, when the communication section 91 of the image display apparatus 62 receives the access-right holding code from the pointing device 61-1, the communication section 91 identifies the access-right holding code.

In step S302, the pointing device 61-1 transmits the access-right holding code to the image-signal output apparatus 63. This access-right holding code is the same code that has been transmitted to the image display apparatus 62 in step S301.

In step S371, when the operation processing section 101 of the image-signal output apparatus 63 receives the access-right holding code from the pointing device 61-1, the operation processing section 101 identifies the access-right holding code.

In step S303, the pointing device 61-1 transmits a key code.

In step S342, the communication section 91 of the image display apparatus 62 receives the key code transmitted from the pointing device 61-1, and stores the individual settings corresponding to the key code in the internal memory.

In step S304, the pointing device 61-1 transmits the key code to the image-signal output apparatus 63.

In step S372, the operation processing section 101 of the image-signal output apparatus 63 receives the key code that has been transmitted from the pointing device 61-1, and stores the individual settings corresponding to the key code into the internal memory.

In this manner, when the operation processing section 101 stores the individual settings, the operation processing section 101 applies the individual settings to the remote control signal from the pointing device 61-1 after that. As a result, a shake of hand is corrected on the basis of the sensitivity of each pointing device 61-1. Also, the pointer 81-1 is displayed with the color and shape corresponding to the pointing device 61-1.

In step S321, the pointing device 61-2 transmits the key code.

In step S343, the communication section 91 of the image display apparatus 62 receives the key code that has been transmitted from the pointing device 61-2, and stores the individual settings corresponding to the key code into the internal memory.

In this manner, when the communication section 91 stores the individual settings, the communication section 91 applies the individual settings to the remote control signal from the pointing device 61-2 after that. As a result, a shake of hand is corrected on the basis of the sensitivity of each of the pointing device 61-2. Also, the pointer 81-2 is displayed with the color and shape corresponding to the pointing device 61-2.

In steps S305 and S306, step S322, steps S344 to S346, steps S361 to S363, and steps S373 and S374, the same processing as that of the corresponding steps in FIG. 7 is performed. That is to say, the same processing as that of steps S203 and S204, step S211, steps S222 to S224, steps S231 to S233, and steps S242 and S243 in FIG. 7 is performed. Accordingly, the explanation on the processing is repetitive, and thus is omitted.

In this manner, it becomes possible for each user to perform operations suitable for his/her pointing device 61 in addition to achieving the same advantages as those of the embodiment in FIG. 3 in this embodiment.

Fifth Embodiment

Configuration of Image Display System

Figure 9:
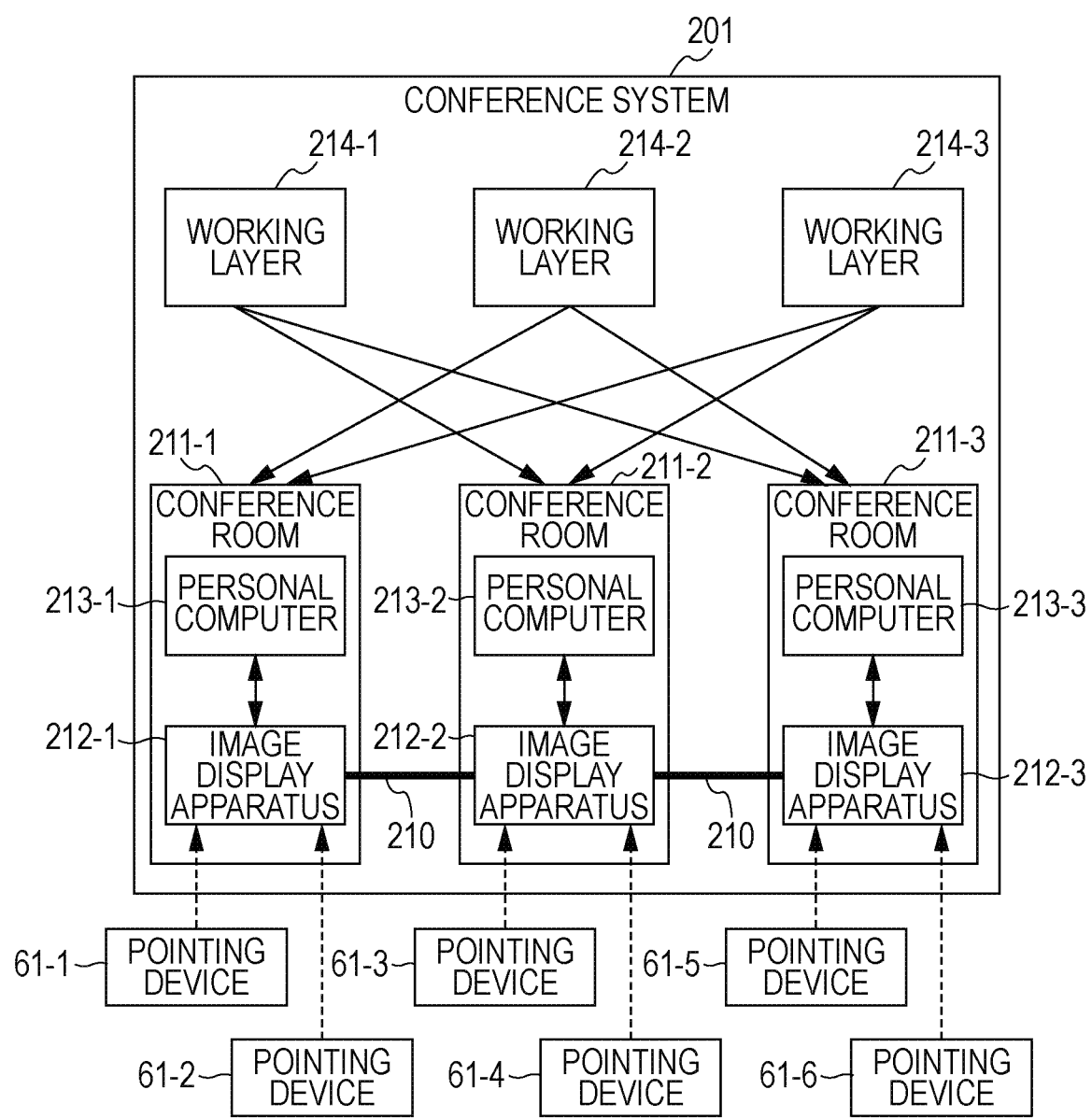
FIG. 9 is a diagram illustrating a configuration of an image display system according to an embodiment of the present invention.

FIG. 9 illustrates a configuration of an image display system according to another embodiment. This image display system is constituted as a conference system 201.

The conference system 201 includes apparatuses in conference rooms 211-1 to 211-3. In the conference room 211-1, an image display apparatus 212-1 and a personal computer 213-1 are disposed. In the conference room 211-2, an image display apparatus 212-2 and a personal computer 213-2 are disposed. In the conference room 211-3, an image display apparatus 212-3 and a personal computer 213-3 are disposed. That is to say, in this embodiment, an image is not displayed on a common display section. Instead, a common image is displayed on the personal computers 213-1 to 213-3 in the individual conference rooms 211-1 to 211-3, respectively.

The image display apparatuses 212-1 to 212-3 have working layers 214-1 to 214-3 in addition to individual image layers, respectively. The image display apparatuses 212-1 to 212-3 are mutually connected by a LAN (Local Area Network) 210 so as to be allowed to exchange information with one another. That is to say, in the case of this embodiment, the working layers are shared by the LAN 210.

Further, in the case of this embodiment, pointing devices 61-1 and 61-2 are disposed in the conference room 211-1. Pointing devices 61-3 and 61-4 are disposed in the conference room 211-2. Pointing devices 61-5 and 61-6 are disposed in the conference room 211-3. Users of the individual conference rooms can hold a conference using the individual pointing devices 61-1 to 61-6, respectively.

Operation of Image Display System

Figure 10:
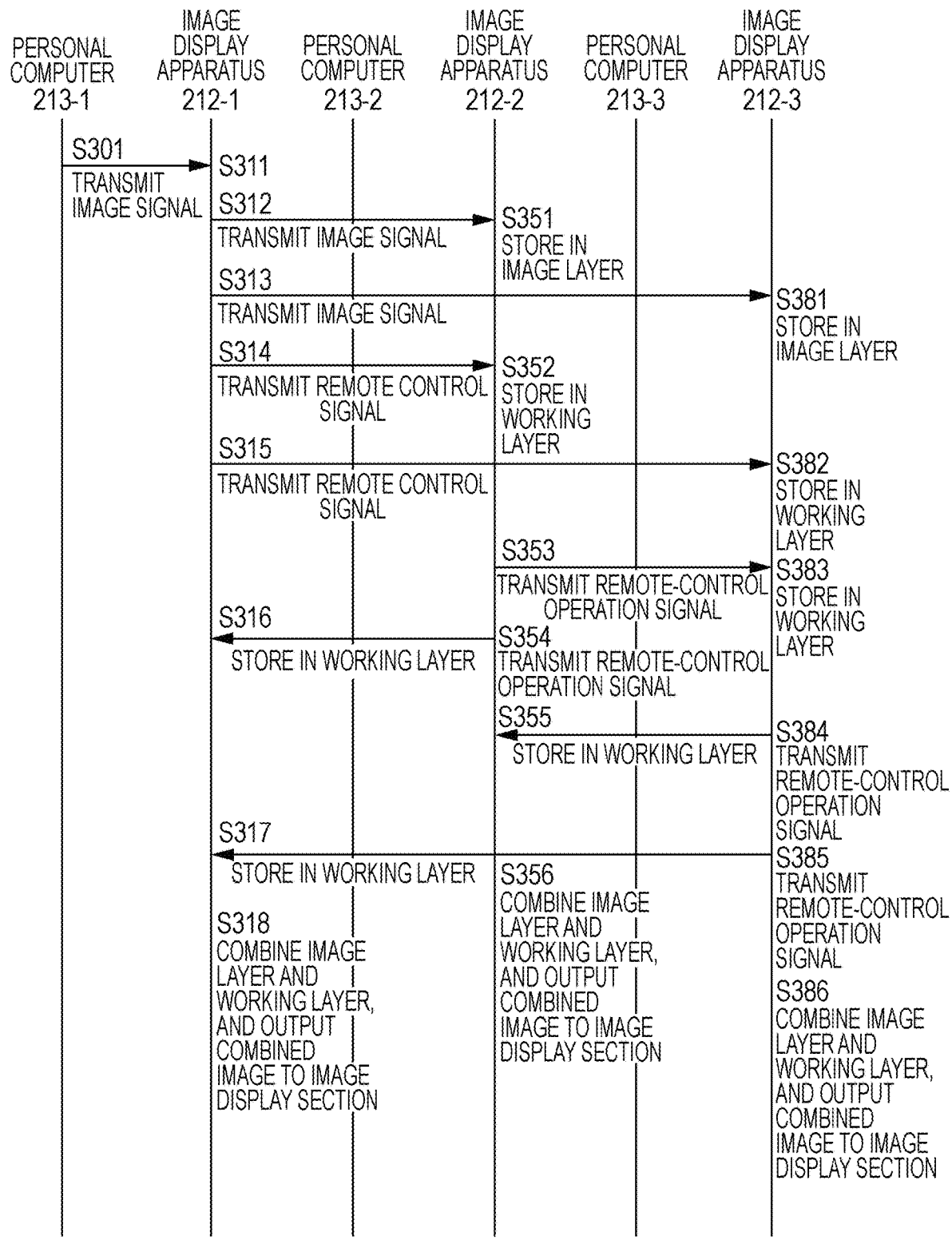
FIG. 10 is a flowchart illustrating operation of an image display system.

FIG. 10 is a flowchart illustrating the operation of the conference system. In the following, a description will be given of operation of a conference system 201 in FIG. 9 with reference to FIG. 10. In this embodiment, it is assumed that a user who is using the pointing device 61-1 in the conference room 211-1 explains an image as a presenter.

A user of the pointing device 61-1 in the conference room 211-1 operates the pointing device 61-1, and outputs a predetermined image to the personal computer 213-1. The personal computer 213-1 that functions as an image-signal output apparatus at this time transmits an image signal in step S301.

The image display apparatus 212-1 in the conference room 211-1 receives the image signal supplied from the personal computer 213-1 in step S311. In step S312, the image display apparatus 212-1 transmits the image to the display apparatus 212-2 in the conference room 211-2 through the LAN 210.

The image display apparatus 212-2 in the conference room 211-2 received the image signal transmitted through the LAN 210 in step S351, and stores the image signal into the image layer.

Further, the image display apparatus 212-1 transmits the image supplied from the personal computer 213-1 to the image display apparatus 212-3 in the conference room 211-3 through the LAN 210 in step S313.

The image display apparatus 212-3 of the conference room 211-3 receives the image signal transmitted through the LAN 210, and stores the image signal into the image layer in step S381.

If the pointing devices 61-1 and 61-2 in the conference room 211-1 are operated, the image display apparatus 212-1 stores the pointers corresponding to the operations, respectively, into the working layer 214-1. Also, if the pointing devices 61-1 and 61-2 are operated, the image display apparatus 212-1 transmits the remote control signals corresponding to the operations, respectively, to the image display apparatus 212-2 in the conference room 214-2 through the LAN 210 in step S314.

In step S352, when the image display apparatus 212-2 in the conference room 211-2 receives a remote control signal through the LAN 210, the image display apparatus 212-2 stores the pointers 81-1 and 81-2 corresponding to the signal into the working layer 214-2.

Further, in step S315, the image display apparatus 212-1 in the conference room 211-1 transmits the remote control signal corresponding to the operations of the pointing devices 61-1 and 61-2 to the image display apparatus 212-3 in the conference room 214-3 through the LAN 210.

In step S382, when the image display apparatus 212-3 in the conference room 211-3 receives the remote control signal through the LAN 210, the image display apparatus 212-3 stores the pointers 81-1 and 81-2 corresponding to the signal into the working layer 214-3.

In the same manner, when the pointing devices 61-3 and 61-4 are operated, the image display apparatus 212-2 in the conference room 211-2 stores the pointers corresponding to the operation into the working layer 214-2. Also, in step S353, when the pointing devices 61-3 and 61-4 are operated, the image display apparatus 212-2 transmits the remote control signals corresponding to the operation to the image display apparatus 212-3 in the conference room 214-3 through the LAN 210.

In step S383, when the image display apparatus 212-3 in the conference room 211-3 receives a remote control signal through the LAN 210, the image display apparatus 212-3 stores the pointers 81-3 and 81-4 (refer to FIG. 11 described later) corresponding to the signal into the working layer 214-3.

Further, in step S354, the image display apparatus 212-2 in the conference room 211-2 transmits the remote control signal corresponding to the operations of the pointing devices 61-3 and 61-4 to the image display apparatus 212-1 in the conference room 214-1 through the LAN 210.

In step S316, when the image display apparatus 212-1 in the conference room 211-1 receives a remote control signal through the LAN 210, the image display apparatus 212-1 stores the pointers 81-3 and 81-4 corresponding to the signals into the working layer 214-1.

When the pointing devices 61-5 and 61-6 are operated, the image display apparatus 212-3 in the conference room 211-3 stores the pointer corresponding to the operation into the working layer 214-3. Also, in step S384, when the pointing devices 61-5 and 61-6 are operated, the image display apparatus 212-3 transmits the remote control signal corresponding to the operation to the image display apparatus 212-2 in the conference room 214-2 through the LAN 210.

In step S355, when the image display apparatus 212-2 of the conference room 211-2 receives the remote control signal through the LAN 210, the image display apparatus 212-2 stores the pointers 81-5 and 81-6 (refer to FIG. 11 described later) corresponding to the signal into the working layer 214-2.

Further, in step S385, the image display apparatus 212-3 in the conference room 211-3 transmits the remote control signal corresponding to the operations of the pointing devices 61-5 and 61-6 to the image display apparatus 212-1 in the conference room 214-1 through the LAN 210.

In step S317, when the image display apparatus 212-1 of the conference room 211-1 receives the remote control signal through the LAN 210, the image display apparatus 212-1 stores the pointers 81-5 and 81-6 corresponding to the signal into the working layer 214-1.

In this manner, the working layer 214-1 contains the own pointers 81-1 and 81-2, and the pointers 81-3 to 81-6 of the working layers 214-2 and 214-3. The working layer 214-2 contains the own pointers 81-3 and 81-4, and the pointers 81-1, 81-2, 81-5, and 81-6 of the working layers 214-1 and 214-3. The working layer 214-3 contains the own pointers 81-5 and 81-6, and the pointers 81-1 to 81-4 of the working layers 214-1 and 214-2. That is to say, each working layer contains the pointers of the other working layers.

In step S318, the image display apparatus 212-1 in the conference room 211-1 combines the image layer and the working layer 214-1, and outputs the result to the personal computer 213-1. Thereby, the image produced by combining the image selected by the pointing device 61-1 and the pointers of the pointing devices 61-1 to 61-6 in the individual conference rooms is displayed onto the personal computer 213-1.

Also, in step S356, the image display apparatus 212-2 in the conference room 211-2 combines the image layer and the working layer 214-2, and outputs the result to the personal computer 213-2. Thereby, the image produced by combining the image selected by the pointing device 61-1, and the pointers of the pointing devices 61-1 to 61-6 in the individual conference rooms is displayed onto the personal computer 213-2.

Further, in step S386, the image display apparatus 212-3 in the conference room 211-3 combines the image layer and the working layer 214-3, and outputs the result to the personal computer 213-3. Thereby, the image produced by combining the image selected by the pointing device 61-1 and the pointers of the pointing devices 61-1 to 61-6 in the individual conference rooms is displayed to the personal computer 213-3.

Figure 11:
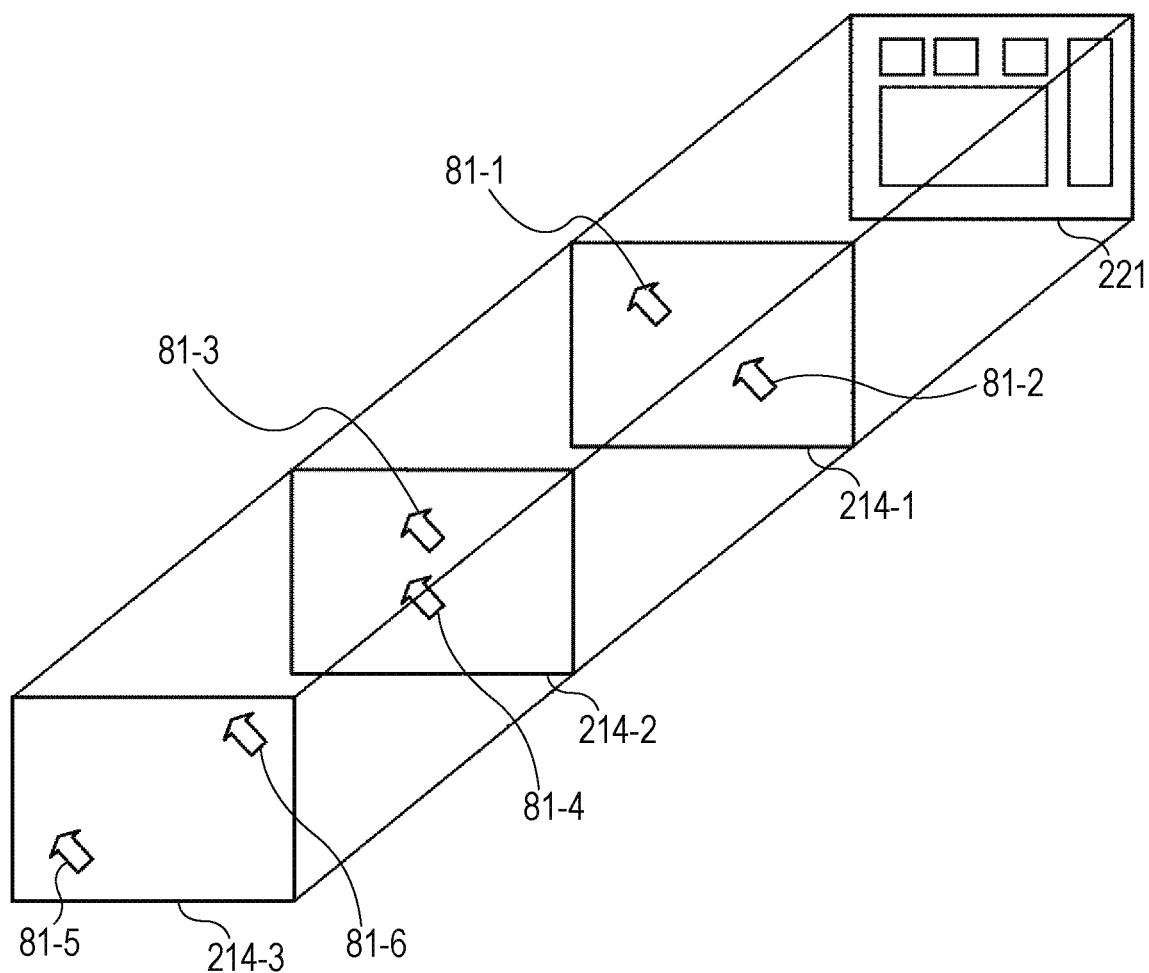
FIG. 11 is a diagram illustrating combination of images.

FIG. 11 is a diagram illustrating combination of images. As described above, a common image as shown in FIG. 11 is displayed to the personal computers 213-1 to 213-3 in the individual conference rooms. That is to say, an image is produced by combining the image of the image layer 221, the image of the working layer 214-1 including the pointers 81-1 and 81-2, the image of the working layer 214-2 including the pointers 81-3 and 81-4, and the working layer 214-3 including pointers 81-5 and 81-6, and the combined image is displayed.

Accordingly, the users of the individual conference rooms are allowed to view a common image, and to point a predetermined portion of the image, and the other users are allowed to learn the pointing position.

As a result, it becomes possible to carry out a smooth conference.

Sixth Embodiment

Configuration of Image Display System

Figure 12:
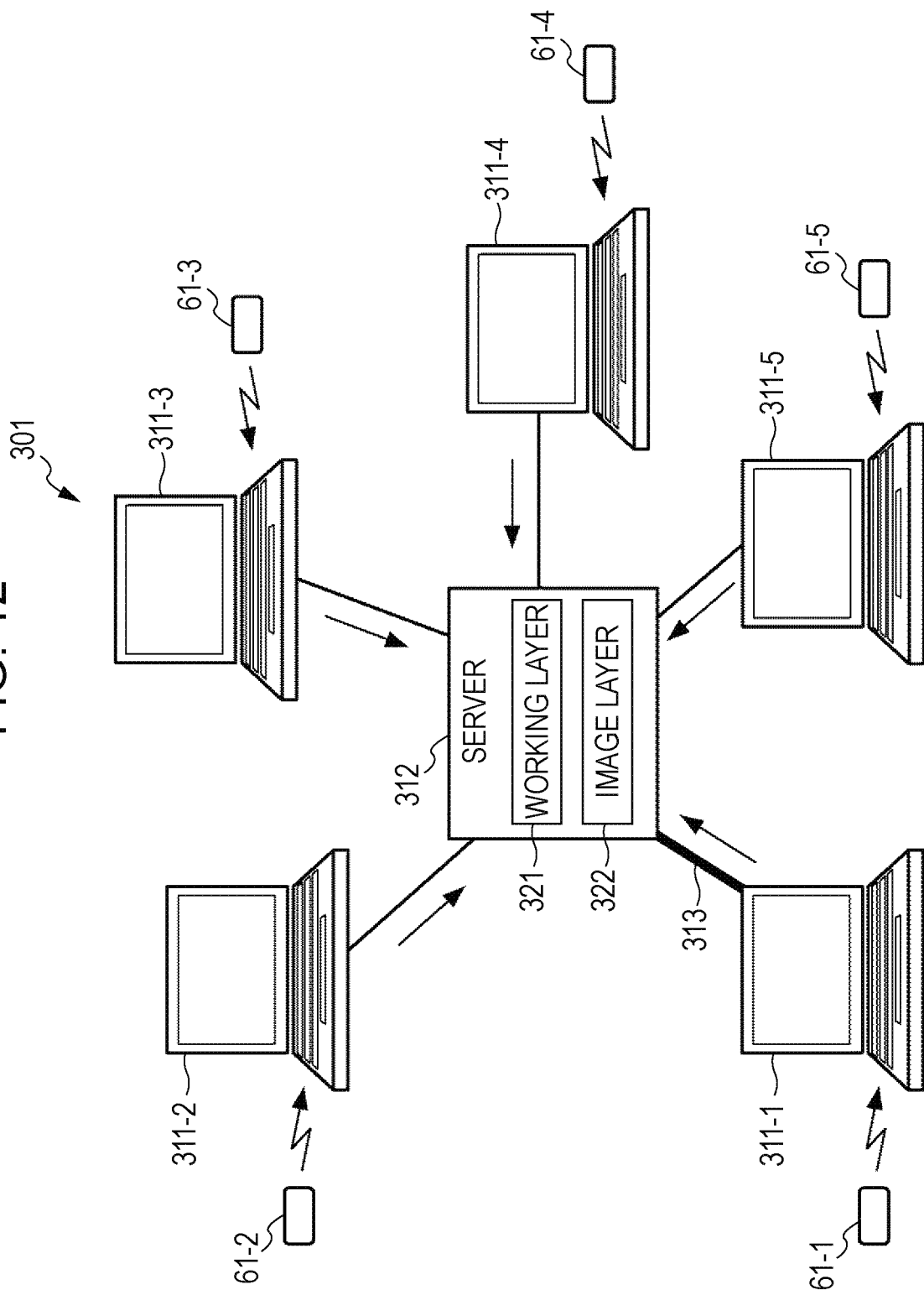
FIG. 12 is a diagram illustrating a configuration of an image display system according to an embodiment of the present invention.

FIG. 12 is a diagram illustrating a configuration of an image display system according to still another embodiment. The image display system 301 includes personal computers 311-1 to 311-5 and a server 312. The personal computers 311-1 to 311-5 and the server 312 are connected through a network 313, such as a LAN, the Internet, etc. In this embodiment, images are not displayed on a common display section, but common images are displayed on display sections of the personal computers 311-1 to 311-5.

The personal computer 311-1 is operated by a pointing device 61-1. The personal computer 311-2 is operated by a pointing device 61-2. The personal computer 311-3 is operated by a pointing device 61-3. The personal computer 311-4 is operated by a pointing device 61-4. The personal computer 311-5 is operated by a pointing device 61-5.

The server 312 has a working layer 321 and an image layer 322.

Operation of Image Display System

Figure 13:
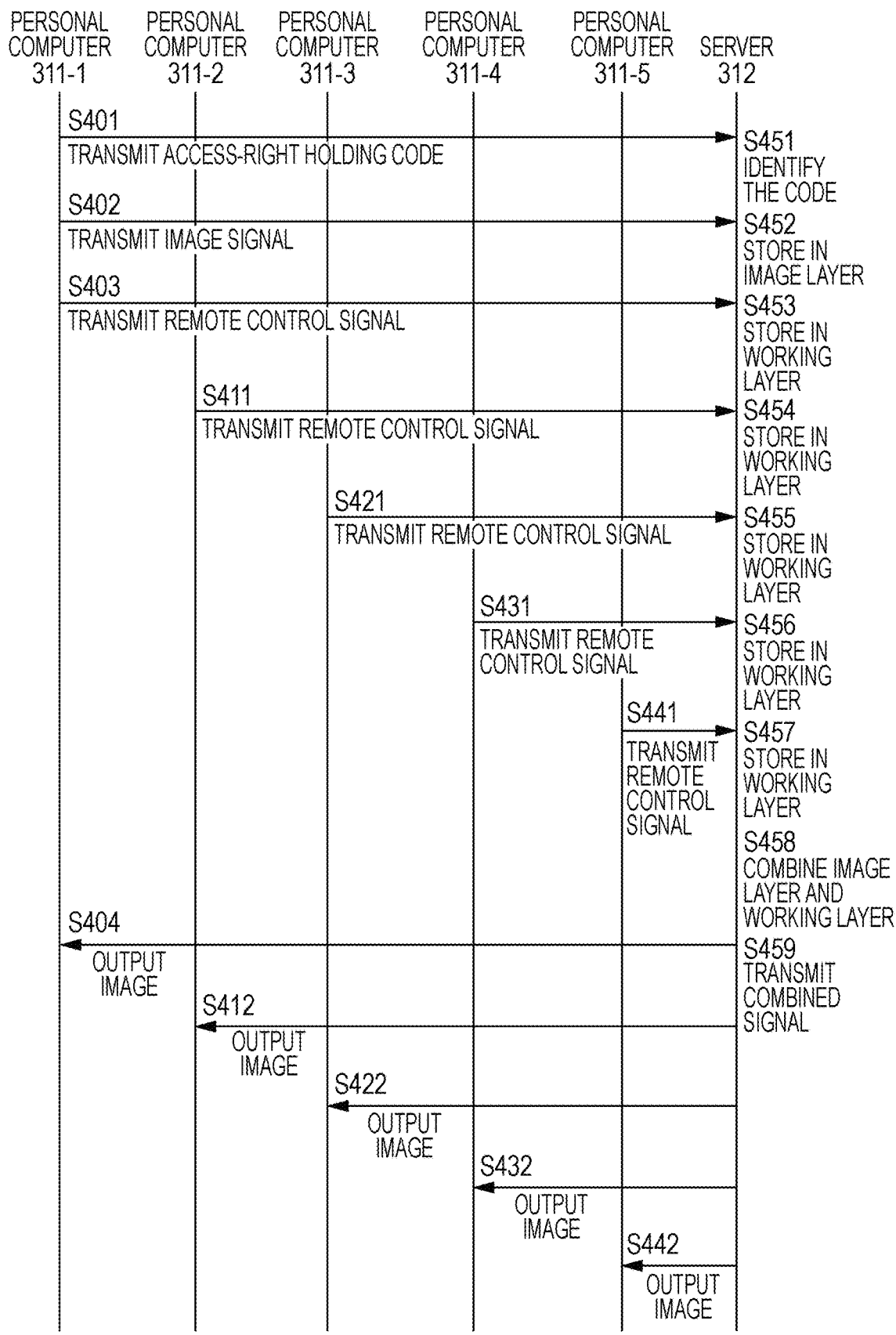
FIG. 13 is a flowchart illustrating operation of an image display system.

FIG. 13 is a flowchart illustrating an operation of the image display system. In the following, a description is given of operation of the image display system 301 in FIG. 12 with reference to FIG. 13. In the case of this embodiment, it is assumed that a presenter is a user of the personal computer 311-1, namely a user of the pointing device 61-1.

In step S401, the personal computer 311-1 transmits the access-right holding code to the server 312.

In step S451, when the server 312 receives an access-right holding code, the server 312 identifies the code. That is to say, if the server 312 authenticates the access-right holding code, the server 312 determines that the personal computer having the identification number attached to the code is a personal computer of the presenter after that.

In step S402, the personal computer 311-1 transmits an image signal to the server 312.

In step S452, when the server 312 receives the image signal, the server 312 stores the image signal into the image layer 322.

In step S403, the personal computer 311-1 transmits a remote control signal corresponding to an operation of the pointing device 61-1 to the server 312.

In step S453, when the server 312 receives the remote control signal, the server 312 stores a pointer 81-1 corresponding to the signal into the working layer 321.

In step S411, the personal computer 311-2 transmits a remote control signal corresponding to an operation of the pointing device 61-2 to the server 312.

In step S454, when the server 312 receives the remote control signal, the server 312 stores a pointer 81-2 corresponding to the signal into the working layer 321.

In step S421, the personal computer 311-3 transmits a remote control signal corresponding to an operation of the pointing device 61-3 to the server 312.

In step S455, when the server 312 receives the remote control signal, the server 312 stores a pointer 81-3 corresponding to the signal into the working layer 321.

In step S431, the personal computer 311-4 transmits a remote control signal corresponding to an operation of the pointing device 61-4 to the server 312.

In step S456, when the server 312 receives the remote control signal, the server 312 stores a pointer 81-4 corresponding to the signal into the working layer 321.

In step S441, the personal computer 311-5 transmits a remote control signal corresponding to an operation of the pointing device 61-5 to the server 312.

In step S457, when the server 312 receives the remote control signal, the server 312 stores a pointer 81-5 corresponding to the signal into the working layer 321.

In step S458, the server 312 combines the images of the image layer 322 and the working layer 321. In step S459, the server 312 transmits the combination signal. That is to say, the combination signal produced by combining the signals in step S458 is transmitted to the personal computers 311-1 to 311-5.

In steps S404, S412, S422, S432, and S442, the individual personal computers 311-1 to 311-5 receive the combination signals, and output the images corresponding to the combination signals, respectively. Thereby, the image selected by the presenter and the pointers 81-1 to 81-5 of the individual pointing devices 61-1 to 61-5 are combined and displayed onto the personal computers 311-1 to 311-5.

Accordingly, the users of the individual personal computers 311-1 to 311-5 are allowed to view a common image, and to point a predetermined portion of the image, and the other users are allowed to learn the pointing positions. As a result, it becomes possible to carry out a smooth conference.

In this regard, the Windows Remote Assistance (a registered trademark of Microsoft Corporation) function can be applied to this embodiment. That is to say, an assistance source and an assistance destination share a working layer so that it becomes possible for users of the assistance source and the assistance destination to operate an assistance-destination personal computer, respectively at the same time. Also, if a plurality of users share a working layer, it becomes possible for the plurality of users to operate the same personal computer. For example, in place of the server 312 in FIG. 12, the personal computer 311-1 is allowed to perform the function of the server, and the personal computer 311-1 can be operated by the other personal computers 311-2 to 311-5.

In this regard, a network is said to be a mechanism in which at least two apparatuses are connected, and which allows transmission of information from one of the apparatuses to the other of the apparatuses. The apparatuses communicating to each other through a network may be independent apparatuses with each other, or may be internal blocks included in one apparatus.

The above-described series of processing can be executed by hardware or can be executed by software. When the series of processing is executed by software, programs of the software may be installed in a computer. Here, the computer includes a computer which is built in a dedicated hardware, and for example, a general-purpose personal computer, etc., capable of executing various functions by installing various programs.

In this regard, the programs executed by the computer may be programs that are processed in time series in accordance with the described sequence in this specification. Alternatively, the programs may be the programs to be executed in parallel or at necessary timing, such as at the time of being called, or the like.

Also, in this specification, a system represents an overall apparatus including a plurality of apparatuses.

The present application contains subject matter related to that disclosed in Japanese Priority Patent Application JP 2009-091681 filed in the Japan Patent Office on Apr. 6, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
at least one processor configured to:
determine that a first apparatus has an access right to perform a first process with respect to an image;
determine that a second apparatus does not have the access right to perform the first process with respect to the image;
execute the first process based on a first operation signal received from the first apparatus which has the access right to perform the first process with respect to the image;
generate an output image based on the first process; and
control projection of the generated output image.

2. The information processing apparatus of claim 1, wherein the at least one processor is configured to give the second apparatus the access right based on a predetermined user operation.

3. The information processing apparatus of claim 1, wherein the at least one processor is configured to execute the first process by providing a first image.

4. The information processing apparatus of claim 3, wherein the at least one processor is configured to generate the image by combining the first image with a second image.

5. The information processing apparatus of claim 1, wherein the at least one processor is configured to execute the first process based on the first operation signal comprising a pointer position.

6. The information processing apparatus of claim 1, wherein the at least one processor is configured to execute the first process based on the first operation signal comprising a decision operation.

7. The information processing apparatus of claim 1, wherein the at least one processor is further configured to generate the image by selecting the image from amongst a plurality of images.

8. The information processing apparatus of claim 1, wherein the at least one processor is configured to store information that corresponds to the first apparatus which has the access right to perform the first process.

9. The information processing apparatus of claim 1, wherein the at least one processor is configured to change the generated image to a new page of the image layer in response to the first operation signal.

10. An information processing method comprising:
   determining that a first apparatus has an access right to perform a first process with respect to an image;
   determining that a second apparatus does not have the access right to perform the first process with respect to the image;
   executing the first process based on a first operation signal received from the first apparatus which has the access right to perform the first process with respect to the image;
   generating an output image based on the first process; and
   controlling projection of the generated output image.

11. A non-transitory computer-readable medium containing instructions that, when executed by at least one processor, perform an information processing method comprising:
   determining that a first apparatus has an access right to perform a first process with respect to an image;
   determining that a second apparatus does not have the access right to perform the first process with respect to the image;
   executing the first process based on a first operation signal received from the first apparatus which has the access right to perform the first process with respect to the image;
   generating an output image based on the first process; and
   controlling projection of the generated output image.

* * * * *